United States Patent [19]

Sarumaru

[11] Patent Number: 4,545,750
[45] Date of Patent: Oct. 8, 1985

[54] APPARATUS FOR VULCANIZING A TIRE

[76] Inventor: Kazumasa Sarumaru, 8-27 Kinmitsu-cho, Ashiya 659, Japan

[21] Appl. No.: 579,427

[22] Filed: Feb. 13, 1984

[30] Foreign Application Priority Data

Mar. 14, 1983 [JP] Japan .................................. 58-44632

[51] Int. Cl.[4] .............................................. B29H 5/02
[52] U.S. Cl. ....................................... 425/32; 425/36; 425/49; 425/58
[58] Field of Search ........................ 425/21, 32, 33, 36, 425/43, 49, 51, 58

[56] References Cited

U.S. PATENT DOCUMENTS

| | | | |
|---|---|---|---|
| 2,812,546 | 11/1957 | Soderquist | 425/32 |
| 2,834,049 | 5/1958 | White | 425/21 |
| 2,901,771 | 9/1959 | Frohlich et al. | 425/32 |
| 2,904,832 | 9/1959 | Frohlich et al. | 425/36 X |
| 2,913,765 | 11/1959 | Frohlich et al. | 425/32 |
| 2,928,119 | 3/1960 | Fassero et al. | 425/21 |
| 2,939,175 | 6/1960 | Frohlich et al. | 425/32 |
| 2,959,815 | 11/1960 | Brundage | 425/32 |
| 2,997,740 | 8/1961 | Soderquist | 425/32 |
| 3,012,277 | 12/1961 | Soderquist | 425/32 |
| 3,153,263 | 10/1964 | Mallory et al. | 425/32 |
| 3,506,748 | 4/1970 | Cardenas et al. | 425/32 X |
| 3,903,227 | 9/1975 | Sarumaru | |
| 3,948,591 | 4/1976 | Kratochvil et al. | 425/32 |
| 4,068,989 | 1/1978 | Cantarutti | |
| 4,181,483 | 1/1980 | Pech et al. | 425/21 X |
| 4,236,883 | 12/1980 | Turk et al. | 425/32 |
| 4,400,342 | 8/1983 | Logan | 425/32 |

FOREIGN PATENT DOCUMENTS 2161939 6/1973 Fed. Rep. of Germany .
2309001 9/1974 Fed. Rep. of Germany .

Primary Examiner—J. Howard Flint, Jr.
Attorney, Agent, or Firm—Marshall, O'Toole, Gerstein, Murray & Bicknell

[57] ABSTRACT

This disclosure relates to apparatus for vulcanizing a tire, and includes a pair of generally annular split dies which are axially movable relative to each other, and a pair of generally circular supports surrounded by the dies. The supports include bead seats which are engagable with the axially outer sides of the tire beads so as to form a closed space between the supports and within the tire. The space is supplied with a pressure medium which is heated during vulcanization. The supports are axially movable relative to each other and to the dies. Each of the supports has mounted thereon a plurality of pivotal members which are movable into engagement with the axially inner sides of the tire beads. The pivotal members press the beads tightly against the bead seats in order to form a seal between the beads and the bead seats.

10 Claims, 7 Drawing Figures

APPARATUS FOR VULCANIZING A TIRE

This invention relates to apparatus for vulcanizing a green tire, such as an automobile tire.

BACKGROUND OF THE INVENTION

U.S. Pat. No. 3,903,227, dated Sept. 2, 1975 discloses tire vulcanizing apparatus including a pair of split dies which form a closed space that receives the tire. The space is supplied with a pressure medium, and means for heating the medium.

Such an apparatus requires the tire beads to closely fit the parts of the apparatus when the dies are closed, in order to keep the pressure medium from leaking from the space through the gaps between the beads and the parts forming the dies. To achieve this, pressing mechanisms are required for mechanically pressing the tire beads against the inner surfaces of the die parts.

Such a pressing mechanism is also required, when the die apparatus is open, to be displaced so as not to obstruct the movement of a tire being placed into or removed from the dies. For this reason, the pressing mechanism as a whole should have a radius less than that of the tire beads, and when the dies are closed, it should extend to the radius of the beads for compression thereof.

The pressing mechanism should also be readily adjustable in order to accommodate tires of various widths.

It is a general object of this invention to provide vulcanizing apparatus including an improved pressing mechanism.

It is another object to provide such a pressing mechanism, which does not obstruct a tire being placed into or removed from the apparatus.

It is a further object to provide such a pressing mechanism, which accommodates various axial widths of tires.

SUMMARY OF THE INVENTION

Apparatus for vulcanizing a tire, embodying the present invention, includes a pair of generally annular split dies which are axially movable relative to each other, and a pair of generally circular supports surrounded by the dies. The supports are engagable with the outer sides of the tire beads so as to form a closed space between the supports and within the tire. The space is supplied with a pressure medium which is heated during vulcanization. The supports are axially movable relative to each other and to the dies. Each of the supports has a plurality of pivotal members supported thereby adjacent its axially inner end, the members being pivotal in an axial plane passing through the axis of the supports. Each of the pivotal members has at least one spring-urged plate supported at the free end thereof. The pivotal members are spring-urged to retract radially inwardly of the supports. Each of the supports has a drive mounted thereon for pivoting the pivotal members radially outwardly, whereby the spring-urged plates compressively force the tire beads against the supports. This pressing of the tire beads is not associated with the axial movements of the dies.

BRIEF DESCRIPTION OF THE DRAWINGS

Preferred embodiments of this invention are shown in the accompanying drawings, wherein.

DETAILED DESCRIPTION OF THE DRAWINGS

Figure 1:
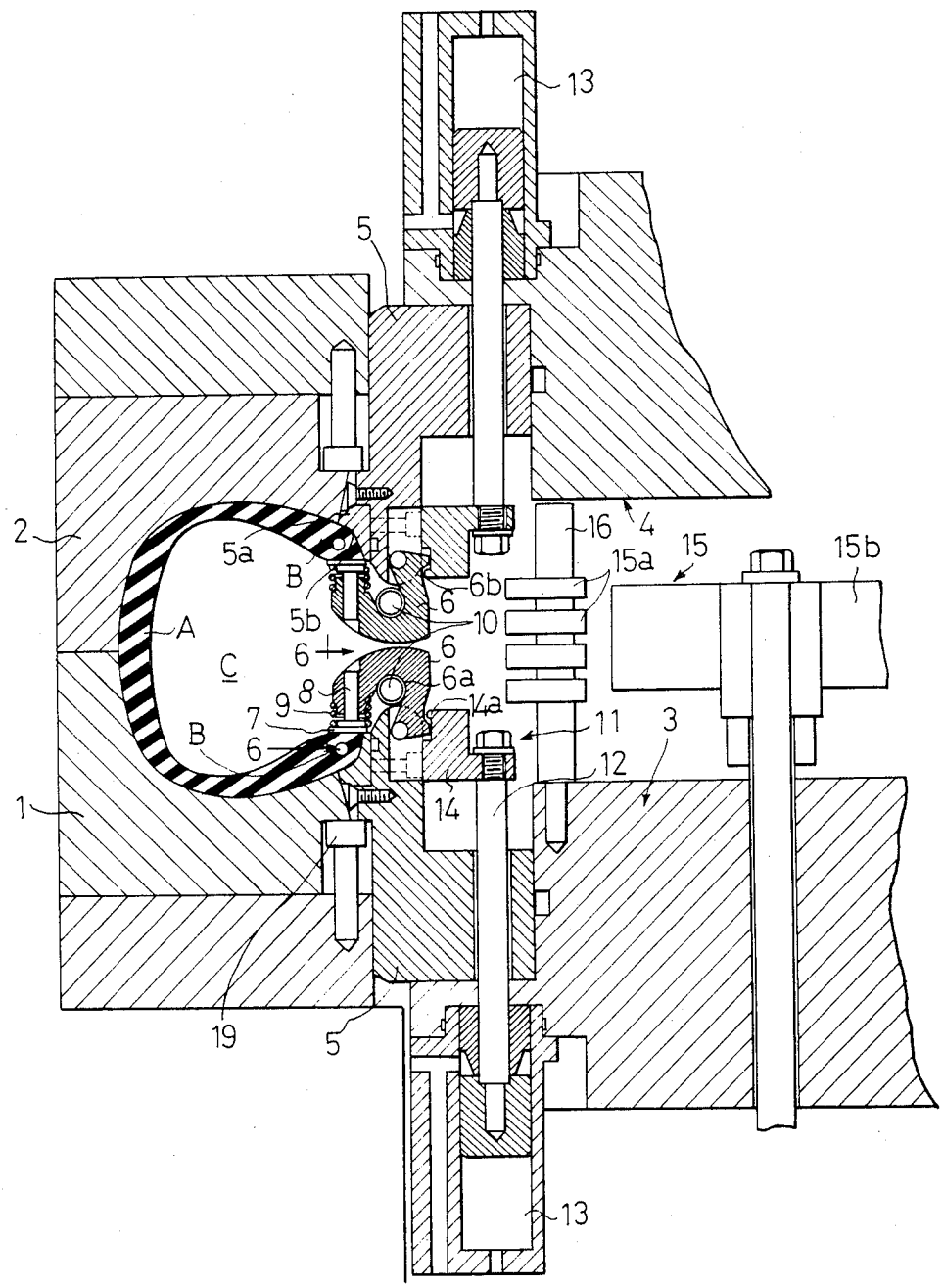
FIG. 1 is a fragmentary sectional view, showing one form of this invention in a closed position.
Figure 2:
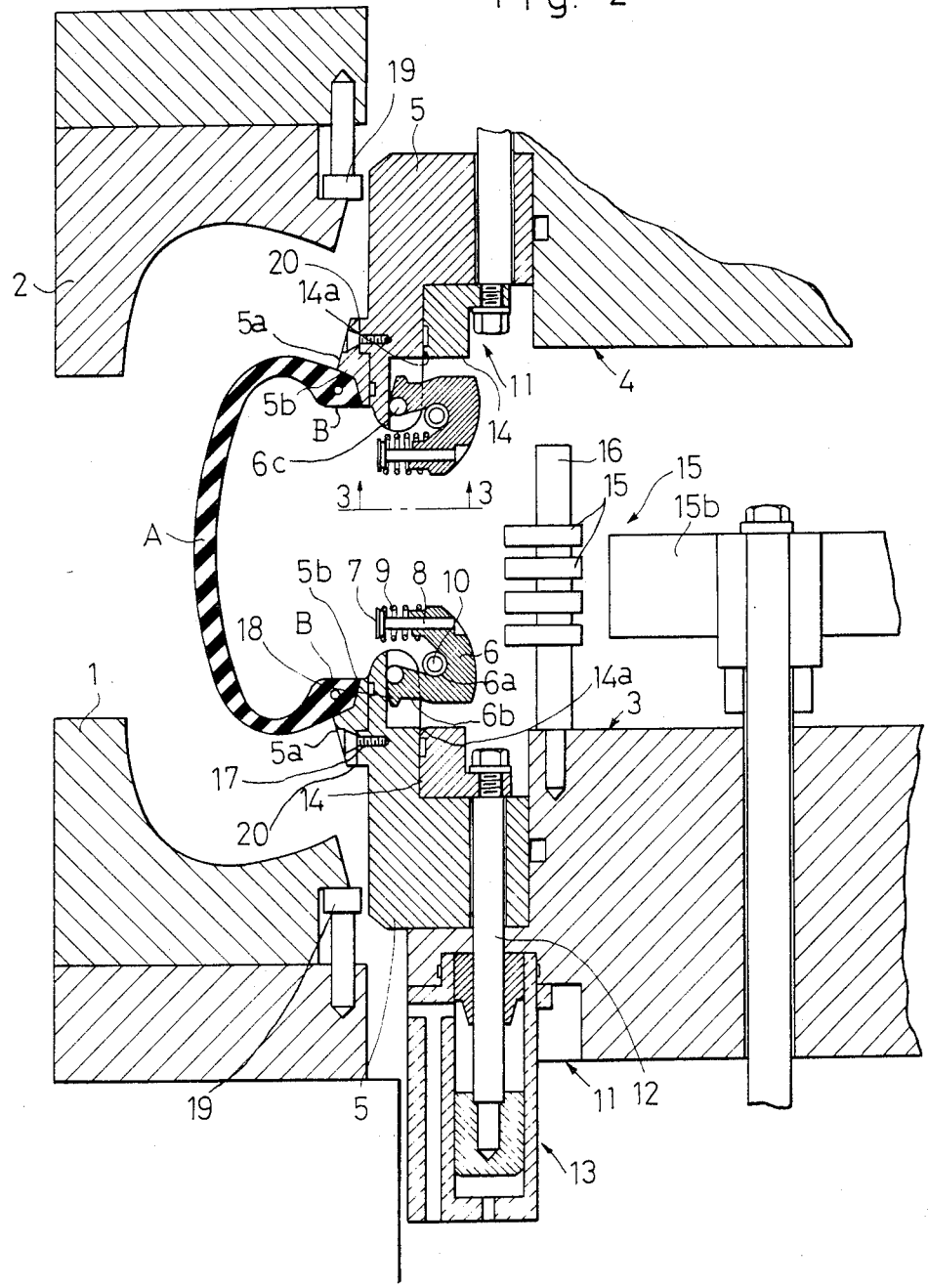
FIG. 2 is a view similar to FIG. 1, but showing the apparatus in an open position.

With reference to FIGS. 1 and 2, the apparatus includes a pair of generally annular split dies 1 and 2 having an interior contour that fits the shape of a tire A to be vulcanized. The lower die 1 is fixed, and the upper die 2 is axially movable (by a conventional drive not shown) and engagable with the lower die, as shown in FIG. 1. The dies surround a pair of circular supports or bead plates 3 and 4, which are axially movable relative to the dies 1 and 2 and to each other by the above-mentioned drive. Each support 3 and 4 has an annular member 5 fixed to its periphery.

Each annular member 5 has a circular rim 5a fixed therearound adjacent its axially inner end, and each rim 5a has a peripheral seat or groove 5b that opens axially inwardly and radially outwardly. Each annular member 5 further has a number of pivotal members 6 supported on its axially inner side at regular circumferential intervals. Each member 6 is pivotable on a pin 6c (FIG. 2) in an axial plane passing through the axis of the annular member 5.

Figure 4:
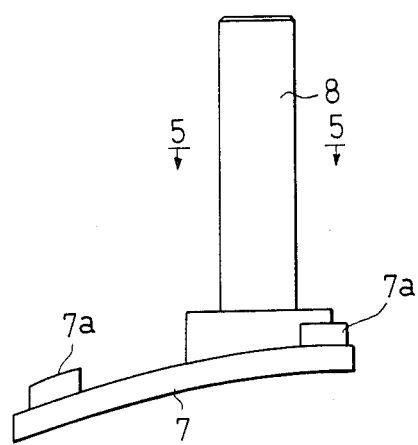
FIG. 4 is an enlarged view of a part of the apparatus, taken on the line 4—4 in FIG. 3.
Figure 5:
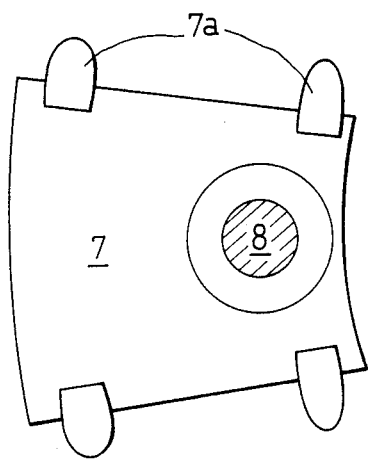
FIG. 5 is a sectional view taken on the line 5—5 of FIG. 4.

Each pivotal member 6 carries at least one shaft 8 which is movable along the axis of the shaft 8. The shaft 8 is supported on the free end of the member 6 and extends generally tangentially with respect to the pivotal movement of member 6. Each shaft 8 has a curved end plate 7 (FIGS. 4-6) fixed to its forward end, and each plate 7 is urged forwardly away from the free end of member 6 by a compression spring 9 (FIG. 3) provided between the plate 7 and the member 6.

Each pivotal member 6 has a recess 6a (FIG. 2) formed in its outer or forward side between its pivoted and free ends, and an oblique or recessed surface 6b in the other side adjacent the pivoted end. The members 6 on each annular member 5 are surrounded by an endless tension spring 10 which fits in the recesses 6a, and the spring 10 tends to pivot the members 6 into their retracted or normal positions shown in FIG. 2. The endless springs 10 may instead be separate tension springs for each of the members 6.

When the dies are closed, the members 6 on each annular member are forced to pivot forwardly and outwardly against the force of the spring 10 by a drive 11, which includes an axially movable ring 14 provided on the axially inner side of the annular member 5. Each ring 14 is connected by rods 12 to hydraulic cylinders 13 fixed to the support 3 or 4, for axial movement of the ring 14 relative to the annular member 5.

Each ring 14 has a flange 14a formed on its axially inner end for slidable and compressive engagement with the oblique sides 6b of the adjacent pivotal members 6, which are forced to pivot outwardly (see FIG. 1) when the rings 14 move axially toward each other, by means of hydraulic cylinders 13. When the rings 14 retract, they allow the members 6 to pivot into the normal position (FIG. 2), and disengage from them. Further, each member 14 has a groove in its outer periphery which engages a projection 18 on each member 6, and pulls the members 6 to the normal position.

Figure 3:
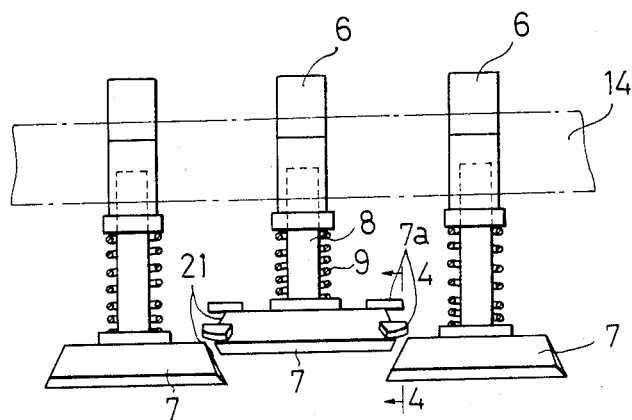
FIG. 3 is an enlarged fragmentary view taken on line 3—3 in FIG. 2.

As shown in FIG. 3, the shafts 8 on the pivotal members 6 are arranged on the same circle but they have alternately different lengths. In the normal position, without pressure, as shown in FIG. 2, the levels of the plates 7 are axially staggered by an amount approximating the thickness of the plates 7 between adjacent pivotal members, so that the adjacent plates do not interfere with each other. This enables the plates 7 to be wider than if they were not staggered, in order to substantially eliminate gaps between the plates when pressing the tire beads B (FIG. 1).

The plate 7 on each shorter shaft 8 has blocks or tabs 7a (FIGS. 3–6) on both radially extending sides, which extend over and engage the adjacent plates 7 when they are pressing the tire beads, in order to align the plates 7 together on a circle for uniform pressure on the beads B.

In FIGS. 1 and 2, conventional heating means 15 is supported on the lower support 3 between the supports 3 and 4, and includes a plurality of heaters 15a mounted around a central fan 15b, which can be driven by a motor (not shown) connected to the lower end of the fan shaft. The heater 15a may take the form of conventional ring plate heaters which are axially spaced for the passage of air.

Upwardly from the top of the heaters 15a extend stops 16 which limit the downward movement of upper support 4, to prevent the upper and lower pivotal members 6 from colliding.

The apparatus operates as described below.

In the open position (not shown) the dies 1 and 2 and the supports 3 and 4 are spaced apart wider than the positions shown in FIG. 2, and each drive ring 14 is retracted or withdrawn on the associated annular member 5 away from the pivotal members 6. The members 6 are urged into the retracted positions (FIG. 2) by the springs 10, where they have an outer diameter that is smaller than the inner diameter of a green tire A. The plates 7 of the pivotal members are alternately offset as shown in FIG. 3 so that adjacent members do not interfere.

A green tire A is then placed on the lower support 3 with the lower tire bead B resting in the seat 5b associated with the support 3. Subsequently, the upper support 4 is lowered until its bead seat 5b engages the upper bead B (FIG. 2).

The drive rings 14 are then moved axially toward each other and the pivotal members 6, and the members 6 are forced to pivot outwardly against the force of springs 10, until the plates 7 engage the inner sides of tire beads B (see FIG. 1). The springs 9 are compressed and apply the compressive pressure on the tire beads to form a seal between the beads and the bead seats 5b. This forms a tightly closed space C that includes the inside of tire A and the space between the supports 3 and 4. The drive rings 14 are moved by applying a pressurized fluid, such as air, in the cylinders 13 behind the pistons.

The supports 3 and 4, the members 5 and the tire A, while spaced as in FIG. 2, are lowered until the lower annulus 5 and the tire A engage the lower die 1. The upper die 2 is then lowered into engagement with the lower die 1 and the tire. This forces the upper support 4 to further lower into the position in FIG. 1, where the whole apparatus is closed, because bolt heads 19 on the dies 1 and 2 engage ledges 20 on the members 5 and press them further together.

The space C is then supplied with a pressure medium such as air through a passage (not shown) in the lower support 3, which is heated by the heating means 15 for vulcanization of the tire.

When the vulcanized and formed tire A is removed from the apparatus, it is necessary to retract the pivotal members 6 before the upper support 4 is moved away from the lower support 3. This is done by removing the pressure behind the pistons of the cylinders 13 which enables the tension springs 10 to contract and pivot the members 6 inwardly. If desired, the cylinders 13 and the pressure may be arranged to apply an outward force on the pistons and thereby forcibly pivot the members 6 by the groove 17 and projection 18 arrangement.

Figure 7:
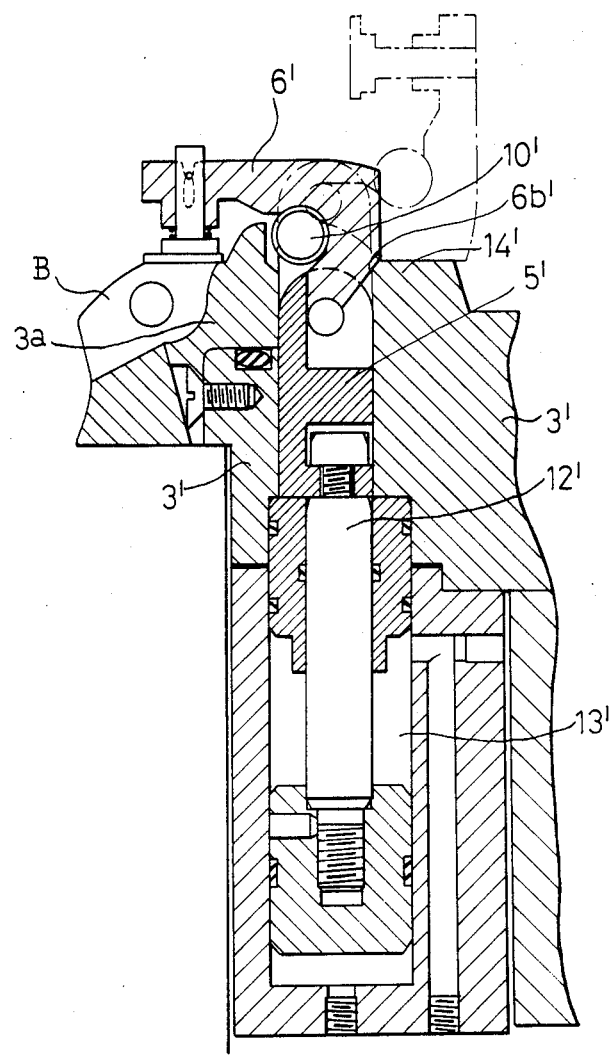
FIG. 7 is a fragmentary sectional view showing another form of the invention.

FIG. 7 shows another embodiment (only some of the lower parts being shown), wherein each support 3' has an annular rim 3a fixed therearound. An annulus 5' is movably supported in the support 3', and connected through rods 12' to hydraulic cylinders 13', for axially slidable movement relative to the support. The support 3' further has an axially inner, peripheral edge or ring 14' located radially within the annulus 5'. The slide annulus 5' carries a number of pivotal members 6' substantially the same as the members 6.

When the annulus 5' is retracted axially outwardly (downwardly) into the support 3', the edge 14' of support 3' compressively slides on the rear sloped edges 6b' of members 6', which are pivoted outwardly against the force of an endless tension spring 10', as shown by solid lines in FIG. 7. When the annulus 5' moves upwardly from the retracted position, the members 6' are retracted as shown by dash-dot lines in FIG. 7.

The other parts of the apparatus are substantially the same as in the embodiment of FIGS. 1–6.

Thus, according to this invention, tires having the same inner diameter but different axial widths can be vulcanized by adjusting the space between the supports 3 and 4. For different inner diameters of tire beads, the pivotal members 6 can be readily replaced with others of appropriate size for the bead diameter. The dies 1 and 2 are also replaceable to meet various tire sizes. The parts operate smoothly without localized overstresses.

Figure 6:
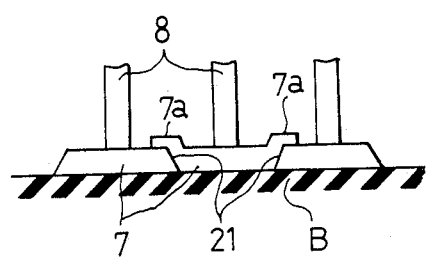
FIG. 6 is a fragmentary view taken on the line 6—6 of FIG. 1.

As shown in FIGS. 3 and 6, the radially extending side edges 21 of the plates 7 that have the blocks 7a are slanted in one direction while the side edges of the other plates 7 have slants in the other direction. These slants enable the plates 7 that do not have the blocks to shift upwardly and smoothly engage the slanted edges of the other plates when the plates are pressed against the axially inner sides of the tire beads. Of course, differences in thicknesses of the beads are adjusted to by the springs 9 and the movable mounting of the plates 7.

What is claimed is:

1. Apparatus for vulcanizing a tire, comprising a pair of generally annular split dies axially movable relative to each other, a pair of generally circular supports surrounded by said dies, said supports including bead seats adapted to engage the axially outer sides of the tire beads so as to form a closed space between said supports and within the tire, said space being adapted to be supplied with a pressure medium and heated, said supports being axially movable relative to each other and to said dies, a plurality of members pivotally mounted on each of said supports adjacent said bead seats, each of said pivotable members including a plate movably mounted adjacent the free end thereof, and compression spring means for urging said plate against the associated tire bead annular tension spring means mounted on said pivotable members of each of said supports for urging said pivotable members to pivot into a retracted position away from the tire bead, and drive means provided on said supports for urging said pivotable members into compressive engagement with the axially inner sides of said tire beads on said bead seats.

2. Apparatus according to claim 1, wherein said plates are staggered alternately when said pivotable members are retracted away from said tire beads.

3. Apparatus according to claim 1 wherein said drive means includes an annulus mounted on each of said supports, said annulus being adapted to be driven to axially move relative to the associated support, said annulus carrying said pivotable members, said support having an axially inner, peripheral edge for compressive engagement with said pivotable members, said edge being adapted to force said members to pivot outwardly when said annulus moves axially outwardly.

4. Apparatus according to claim 1, wherein at least some of said plates include blocks thereon for engaging adjacent plates.

5. Apparatus for vulcanizing a tire, comprising a pair of generally annular split dies axially movable relative to each other, a pair of generally circular removable supports spaced radially inwardly of said dies, said supports including bead seats adapted to engage the axially outer sides of the tire beads so as to form a closed space between said supports and within the tire, said space being adapted to be supplied with a pressure medium and heated, at least one member movably mounted on each of said supports adjacent said bead seats and movable into engagement with the axially inner sides of said tire beads, and drive means mounted on each of said supports and connected to said members associated therewith for moving said members.

6. Apparatus according to claim 5, wherein each of said movable members includes a plate movably mounted adjacent the free end thereof, and compression spring means for urging said plate against the associated tire bead, annular tension spring means mounted on said movable members of each of said supports for urging said movable members to pivot into a retracted position away from the tire bead.

7. Appparatus according to claim 1, wherein said drive means includes a ring mounted on each of said supports, said ring being adapted to be driven to axially move relative to the associated support, said ring being able to slidably engage said pivotable members.

8. Apparatus according to claim 7, wherein each of said pivotable members has a surface, which is so oblique that the slide of said ring on said surface varies the pressure on the tire bead.

9. Apparatus according to claim 7, wherein each of said pivotable members has a recess, said ring having a flange adapted to engage said recess so that the axially outward movement of said ring forces said pivotable members to pivot out of engagement with the tire bead.

10. Apparatus according to claim 3, wherein each of said pivotable members has an oblique surface for slidable engagement with said peripheral edge of said support, said surface being so oblique that the slide of said edge on said surface varies the pressure on the tire bead.

* * * * *